(12) United States Patent
Lai et al.

(10) Patent No.: US 12,327,910 B2
(45) Date of Patent: Jun. 10, 2025

(54) TERMINAL

(71) Applicant: Huawei Technologies Co., Ltd., Shenzhen (CN)

(72) Inventors: Ben Lai, Wuhan (CN); Yuhui Wang, Shenzhen (CN); Ning Ma, Shenzhen (CN); Quan Yu, Wuhan (CN); Kemeng Wang, Dongguan (CN); Teng Long, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 9 days.

(21) Appl. No.: 17/802,346

(22) PCT Filed: Dec. 15, 2020

(86) PCT No.: PCT/CN2020/136405
§ 371 (c)(1),
(2) Date: Aug. 25, 2022

(87) PCT Pub. No.: WO2021/169500
PCT Pub. Date: Sep. 2, 2021

(65) Prior Publication Data
US 2023/0155275 A1     May 18, 2023

(30) Foreign Application Priority Data
Feb. 25, 2020 (CN) .......................... 202010117703.8

(51) Int. Cl.
*H01Q 1/24* (2006.01)
*G06F 3/0354* (2013.01)
(Continued)

(52) U.S. Cl.
CPC .......... *H01Q 1/241* (2013.01); *G06F 3/03545* (2013.01); *H01Q 1/46* (2013.01)

(58) Field of Classification Search
CPC .......... H01Q 1/24; H01Q 1/241; H01Q 1/243; H01Q 9/40; H01Q 9/42; H01Q 13/00;
(Continued)

(56) References Cited

U.S. PATENT DOCUMENTS

2003/0214801 A1* 11/2003 Wang ................ H01Q 1/44
                                                                        361/814
2005/0146475 A1    7/2005 Bettner et al.
(Continued)

FOREIGN PATENT DOCUMENTS

CN       106058461 A     10/2016
CN       106502321 A      3/2017
(Continued)

OTHER PUBLICATIONS

W. Choi, et al., "U-shaped slot-array antenna for RFID shelf in the UHF," IEEE International Symposium on Antennas and Propagation (APSURSI), 2011, 3 pages.

*Primary Examiner* — Thai Pham
(74) *Attorney, Agent, or Firm* — Conley Rose, P.C.

(57) ABSTRACT

A terminal includes a terminal body part and an electronic accessory part. A WI-FI antenna apparatus is disposed on the terminal body part. The WI-FI antenna apparatus has a closed slot antenna. The closed slot antenna has an antenna slot that includes a main straight slot and a first slot and a second slot that are separately bent with respect to two ends of the main straight slot and extend to a same side of the main straight slot. The first slot and the second slot are perpendicular to the main straight slot, and the electronic accessory part is located on a side surface of the main straight slot.

19 Claims, 10 Drawing Sheets

(51) Int. Cl.
*H01Q 1/46* (2006.01)
*H01Q 13/16* (2006.01)

(58) Field of Classification Search
CPC .......... H01Q 13/16; H01Q 13/18; H01Q 1/22; H01Q 1/2266; H01Q 1/2291; H01Q 1/46; G06F 3/03545; G06F 1/1607; G06F 1/1637; G06F 1/1681; G06F 1/1683
See application file for complete search history.

(56) References Cited

U.S. PATENT DOCUMENTS

| | | | | |
|---|---|---|---|---|
| 2009/0174607 | A1* | 7/2009 | Yan | H01Q 5/378 343/846 |
| 2012/0313834 | A1* | 12/2012 | Eom | H01Q 7/00 343/700 MS |
| 2014/0029183 | A1* | 1/2014 | Ashcraft | G06F 1/26 361/679.02 |
| 2014/0071009 | A1* | 3/2014 | Cheng | H01Q 5/378 343/770 |
| 2014/0097992 | A1* | 4/2014 | Cheng | G06F 1/1698 343/702 |
| 2014/0184450 | A1* | 7/2014 | Koo | H01Q 1/2266 343/702 |
| 2014/0347814 | A1* | 11/2014 | Zaloom | G06F 1/1626 248/688 |
| 2017/0097698 | A1* | 4/2017 | Maeshima | G06F 3/03545 |
| 2017/0309993 | A1 | 10/2017 | Tu et al. | |
| 2018/0301789 | A1* | 10/2018 | Lee | H01Q 1/243 |
| 2021/0135335 | A1 | 5/2021 | Suzuki et al. | |
| 2022/0393360 | A1* | 12/2022 | Zhang | H01Q 21/28 |

FOREIGN PATENT DOCUMENTS

| | | |
|---|---|---|
| CN | 108321490 A | 7/2018 |
| CN | 110383583 A | 10/2019 |
| EP | 2503637 A1 | 9/2012 |
| EP | 3113285 A1 | 1/2017 |
| WO | 2020044033 A1 | 3/2020 |

* cited by examiner

TERMINAL

CROSS-REFERENCE TO RELATED APPLICATIONS

This is a U.S. National Stage of International Patent Application No. PCT/CN2020/136405 filed on Dec. 15, 2020, which claims priority to Chinese Patent Application No. 202010117703.8 filed on Feb. 25, 2020, both of which are hereby incorporated by reference in their entireties.

TECHNICAL FIELD

This application relates to the field of communications technologies, and in particular, to a terminal.

BACKGROUND

Because a posture of a terminal is uncertain during use of the terminal, in a process of implementing wireless communication, a directivity factor of an antenna needs to be reduced as much as possible, so that a requirement of communication in each azimuth is better covered. In addition, as specified in the industry, a wireless fidelity (Wireless Fidelity, Wi-Fi) antenna needs to have either a relatively low directivity factor or relatively low transmit power of the antenna. For a conventional terminal Wi-Fi antenna, directivity factor optimization of the antenna is mainly implemented by adjusting a layout position of the antenna in an entire system. If the layout position of the antenna is limited, it is difficult to control a directivity factor because of impact am entire-system environment. Therefore, when the layout position of the conventional Wi-Fi antenna is limited, transmit power of the antenna is limited because the directivity factor of the antenna is relatively large.

SUMMARY

Technical solutions of this application provide a terminal, to reduce a directivity factor of a Wi-Fi antenna when a layout position of the antenna is limited, thereby improving transmit power of the antenna.

According to a first aspect, the technical solutions of this application provide a terminal, including a terminal body part and an electronic accessory part. A Wi-Fi antenna apparatus is disposed on the terminal body part, the Wi-Fi antenna apparatus has a closed slot antenna, the closed slot antenna includes a main straight slot and a first slot and a second slot that are separately bent from two ends of the main straight slot and extend to a same side of the main straight slot, both the first slot and the second slot are perpendicular to the main straight slot, and the electronic accessory part is located on a side surface of the main straight slot.

Optionally, the terminal body part is a flat-panel structure, the terminal body part includes two opposite main surfaces and a side surface connecting the two main surfaces, an antenna slot of the closed slot antenna is disposed on one of the two main surfaces, and the electronic accessory part is detachably connected to a relative position of the side surface of the terminal body part.

Optionally, the antenna slot of the closed slot antenna is shaped in "U" or non-closed square.

Optionally, the terminal body part is a tablet computer, and the electronic accessory part is a stylus.

Optionally, the terminal is a notebook computer, the terminal body part is a computer body part, and the terminal body part includes an upper housing and a lower housing that are opposite and four side housings connecting the upper housing and the lower housing. The electronic accessory part is a display, the terminal body part has a hinge area on a side edge of one side housing, and the electronic accessory part is connected to the terminal body part in the hinge area by a hinge. The closed slot antenna is located on the side housing corresponding to the hinge area.

Optionally, when the notebook computer is in a folded state, a display surface of the electronic accessory part is facing to the upper housing of the terminal body part. The upper housing of the terminal body part is a ground electrically connected to the closed slot antenna.

Optionally, the antenna slot of the closed slot antenna is shaped in non-closed square.

Optionally, an end of the antenna slot of the closed slot antenna is located on a side that is of the antenna slot and that is close to the upper housing of the terminal body part.

In the terminal in embodiments of this application, the first slot and the second slot that are separately bent from two ends of the main straight slot and to the same side of the main straight slot are disposed, so that electric fields at the first slot and the second slot offset against each other. Therefore, when a layout position of the Wi-Fi antenna is limited, radiation intensity of the antenna in a same direction can be reduced, in other words, a directivity factor of the antenna is reduced, so that transmit power of the antenna is improved.

DESCRIPTION OF EMBODIMENTS

Terms used in embodiments of this application are only used to explain specific embodiments of this application, but are not intended to limit this application.

Figure 1:
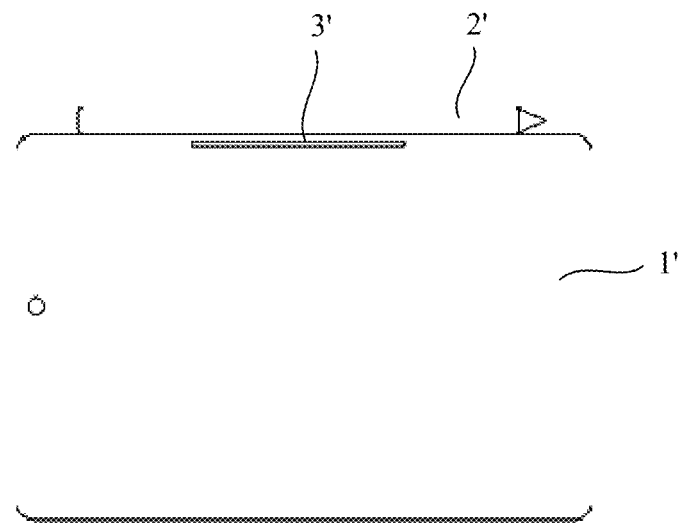
FIG. 1 is a schematic diagram of a structure of a tablet computer according to the conventional technology.
Figure 2:
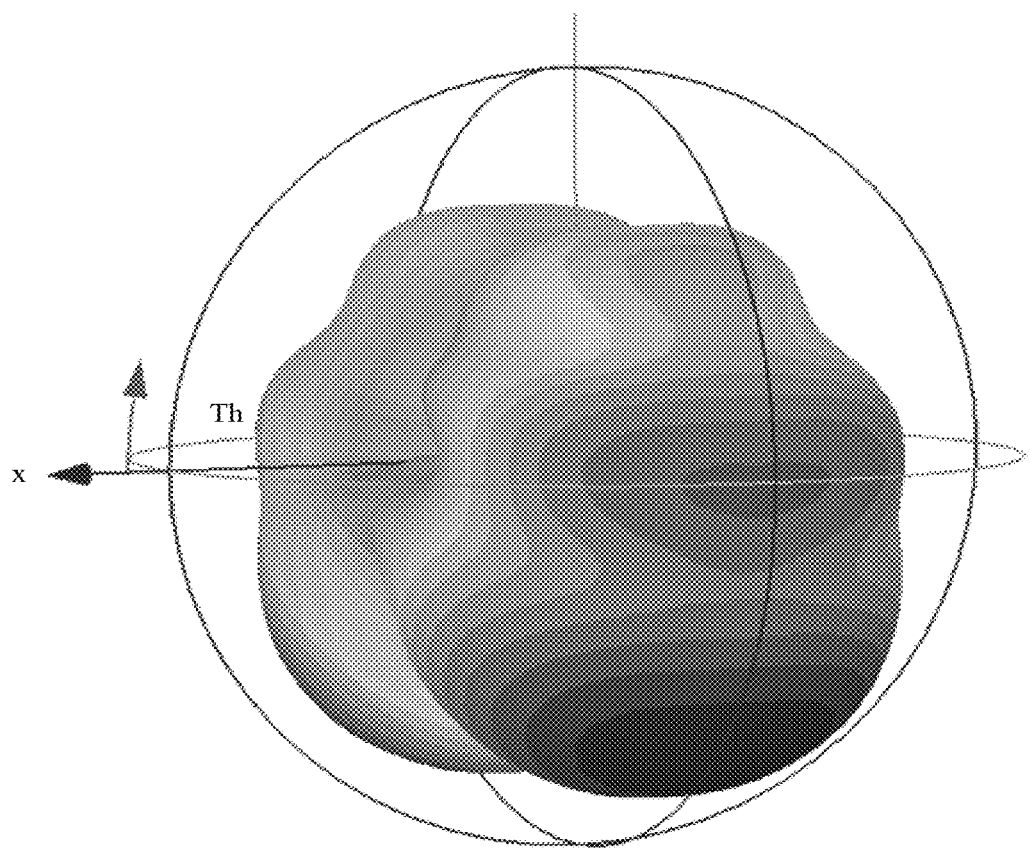
FIG. 2 is a radiation pattern of a Wi-Fi antenna of the tablet computer in FIG. 1.
Figure 3:
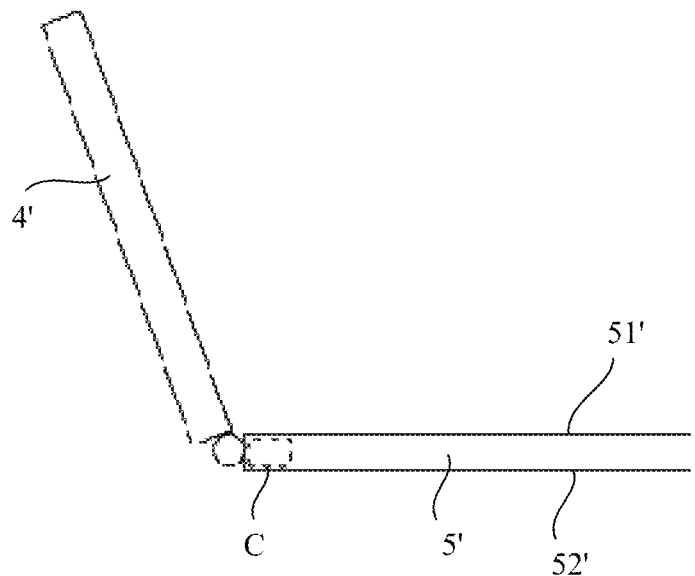
FIG. 3 is a side view of a notebook computer according to the conventional technology.
Figure 4:
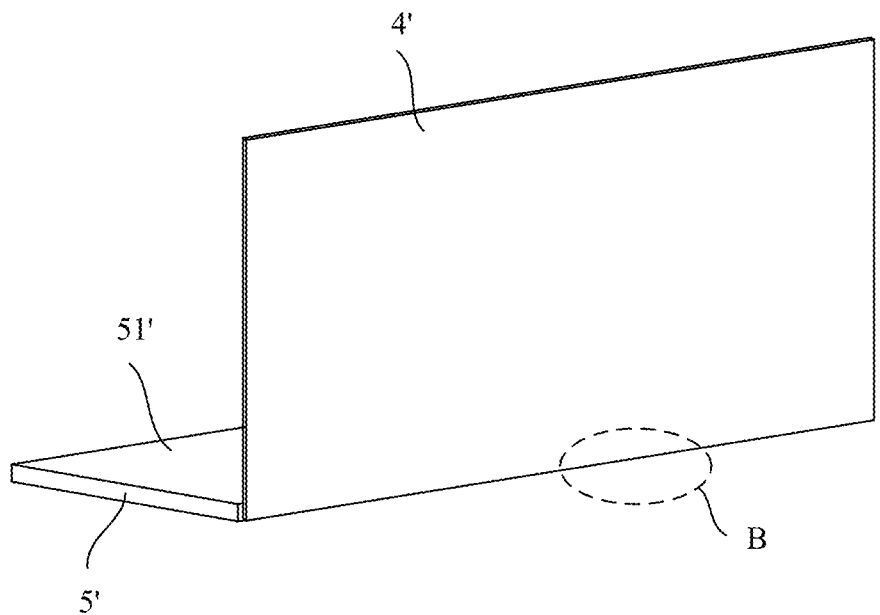
FIG. 4 is a schematic diagram of a three-dimensional structure of the notebook computer in FIG. 3.
Figure 5:
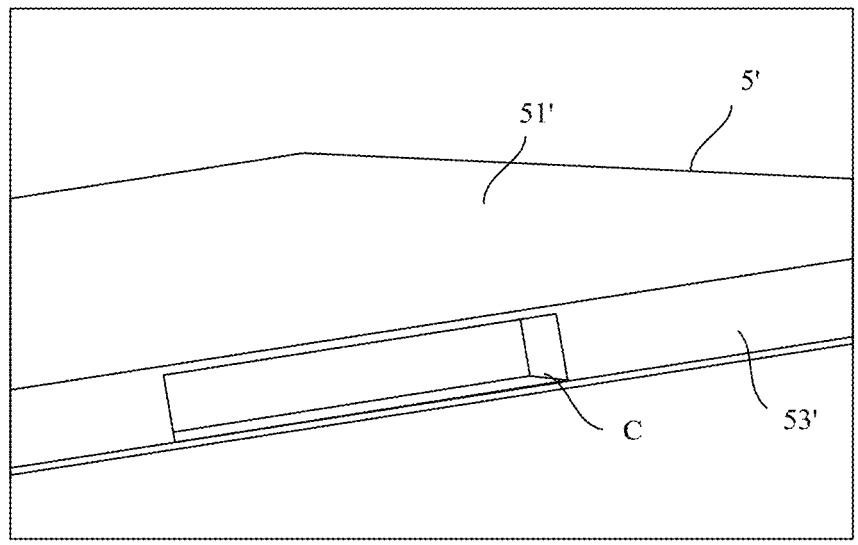
FIG. 5 is a schematic diagram of an enlarged structure of an area B in FIG. 4.
Figure 6:
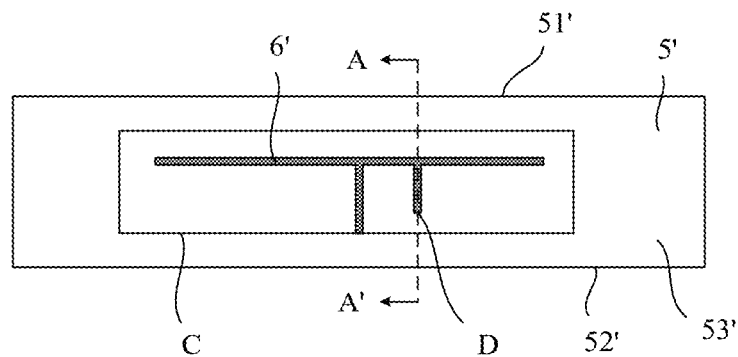
FIG. 6 is a schematic diagram of an enlarged structure of a part of side surface of the notebook computer in FIG. 3.
Figure 7:
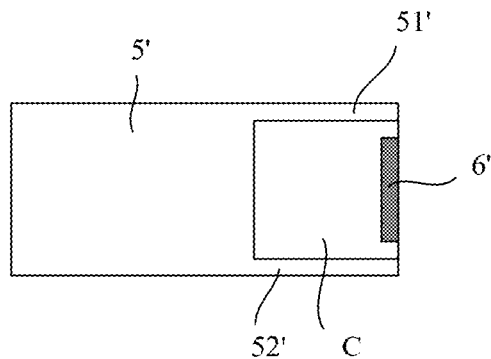
FIG. 7 is a schematic diagram of a cross-sectional structure in a direction AA' in FIG. 6.
Figure 8:
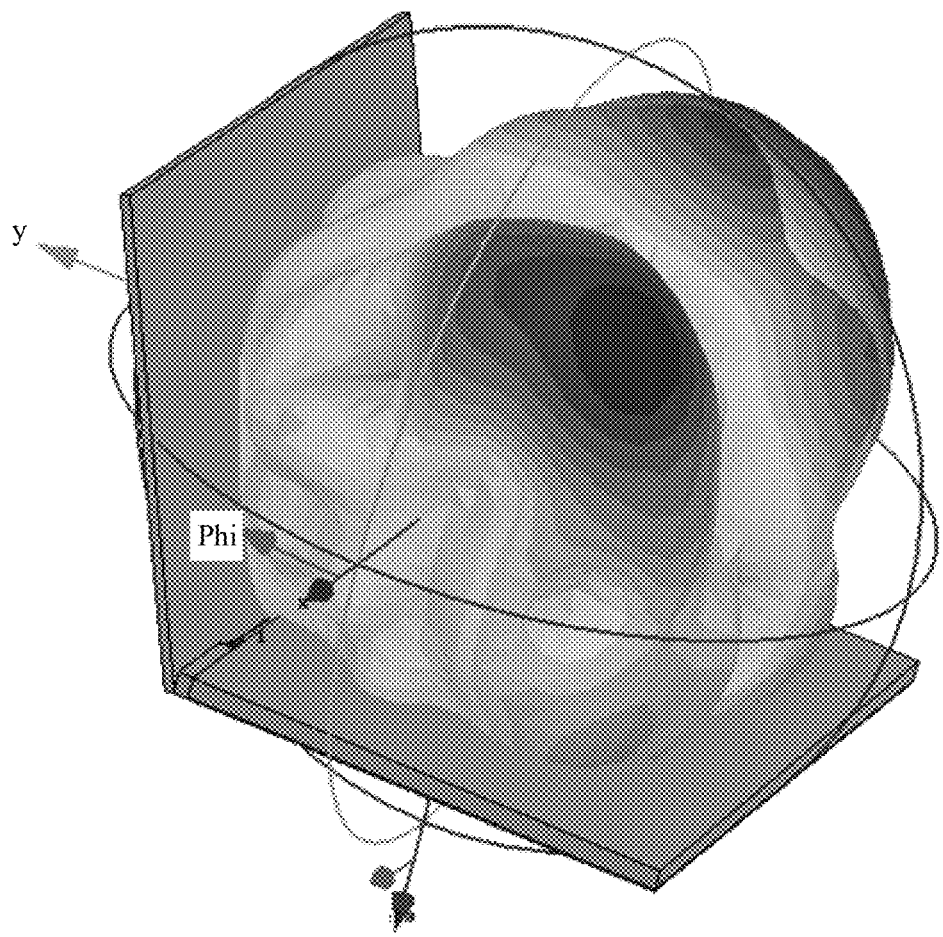
FIG. 8 is a radiation pattern of a Wi-Fi antenna of the notebook computer in FIG. 3.

Before embodiments of this application are described, a problem in the conventional technology is first briefly described. FIG. 1 is a schematic diagram of a structure of a tablet computer according to the conventional technology. FIG. 2 is a radiation pattern of a Wi-Fi antenna of the tablet computer in FIG. 1. FIG. 1 is a schematic diagram of a structure of a tablet computer. A stylus is disposed on a side surface of a body 1' of the tablet computer. Being limited by an appearance or another reason, a position of a Wi-Fi antenna 3' is located near the stylus, and a straight closed slot antenna design is usually used. A 2.4 GHz Wi-Fi antenna is used as an example. As shown in FIG. 2, because of impact on antenna radiation that is caused by the stylus, a radiation intensity difference between upper and lower sides of an antenna slot is relatively large, and therefore a directivity factor of the antenna is relatively large and reaches 7.5 dBi. In addition, refer to FIG. 3 to FIG. 8. FIG. 3 is a side view of a notebook computer according to the conventional technology. FIG. 4 is a schematic diagram of a three-dimensional structure of the notebook computer in FIG. 3. FIG. 5 is a schematic diagram of an enlarged structure of an area B in FIG. 4. FIG. 6 is a schematic diagram of an enlarged structure of a part of side surface of the notebook computer in FIG. 3. FIG. 7 is a schematic diagram of a cross-sectional structure in a direction AA' in FIG. 6. FIG. 8 is a radiation pattern of a Wi-Fi antenna of the notebook computer in FIG. 3. The notebook computer includes a screen 4' and a body part 5'. The body part 5' includes an upper housing 51', a lower housing 52', and a side housing 53' close to a hinge. As shown in FIG. 5, the screen 4' is omitted in FIG. 5, the side housing 53' close to the hinge has a recessed area C, and a Wi-Fi antenna 6' is disposed in the area C. A specific structure of the Wi-Fi antenna 6' is omitted in FIG. 5. As shown in FIG. 6 and FIG. 7, to maintain a product appearance to the greatest extent, the antenna 6' is usually disposed in the recessed area C. A conventional antenna 6' is designed in a form of an inverted-F antenna (Inverted-F Antenna, IFA). A feed position D is located between the antenna 6' and the lower housing 52'. The lower housing 52' is grounded. A 2.4 GHz Wi-Fi antenna is used as an example. As shown in FIG. 8, because of impact on the antenna that is caused by the screen 4', a radiation intensity difference between upper and lower sides of the antenna is relatively large, and therefore a directivity factor of the antenna is relatively large and reaches at least 8 dBi.

Figure 9:
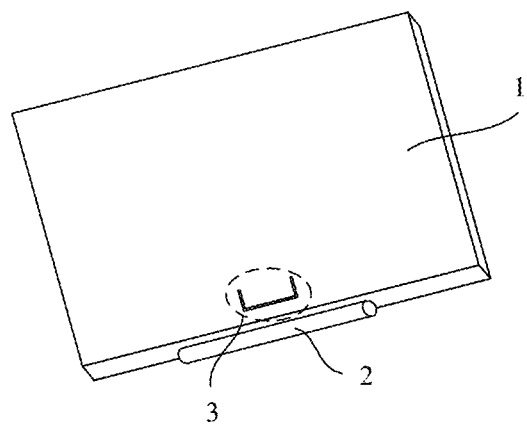
FIG. 9 is a schematic diagram of a three-dimensional structure of a terminal according to an embodiment of this application.
Figure 10:
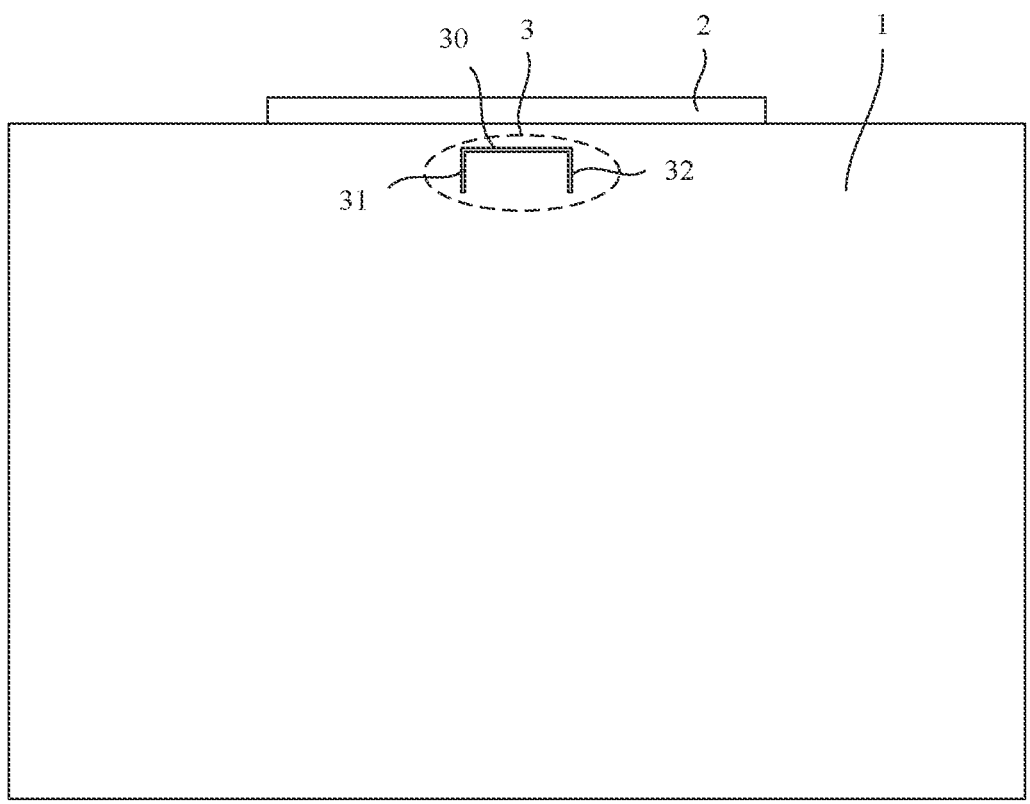
FIG. 10 is a top view of the terminal in FIG. 9.

The following describes embodiments of this application. Refer to FIG. 9 and FIG. 10. FIG. 9 is a schematic diagram of a three-dimensional structure of a terminal according to an embodiment of this application. FIG. 10 is a top view of the terminal in FIG. 9. An embodiment of this application provides a terminal, including a terminal body part 1 and an electronic accessory part 2. A antenna apparatus is disposed on the terminal body part 1, the antenna apparatus has a closed slot antenna 3, the closed slot antenna 3 includes a main straight slot 30 and a first slot 31 and a second slot 32 that are separately bent from two ends of the main straight slot 30 and extend to a same side of the main straight slot 30, both the first slot 31 and the second slot 32 are perpendicular to the main straight slot 30, and the electronic accessory part 2 is located on a side surface of the main straight slot 30.

Figure 11:
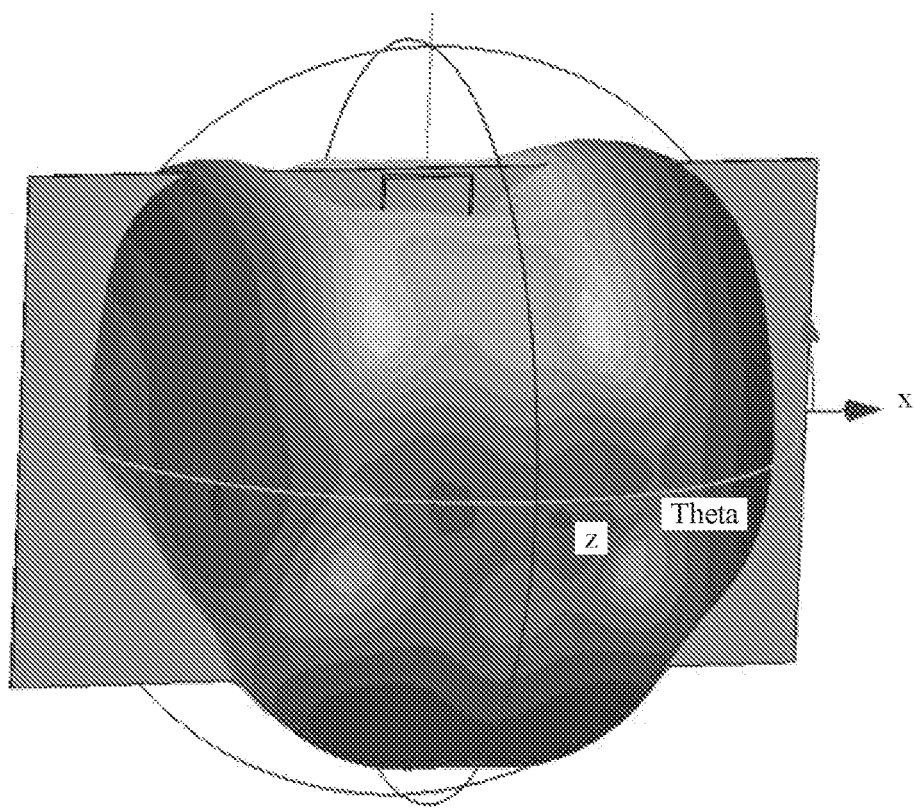
FIG. 11 is a radiation pattern of a Wi-Fi antenna of the terminal in FIG. 10.

Specifically, electric field directions are consistent on two sides of a slot of the closed slot antenna 3. For example, in a structure shown in FIG. 10, an electric field direction at the main straight slot 30 is from top to bottom, an electric field direction at the first slot 31 is from left to right, and an electric field direction at the second slot 32 is from right to left. Because the first slot 31 and the second slot 32 are opposite, electric fields at the first slot 31 and the second slot 32 offset against each other instead of being superposed, so that radiation enhancement of the antenna in a same direction is reduced. Therefore, when a position at which the closed slot antenna 3 is disposed is limited, although a radiation direction of the closed slat antenna 3 is affected by the electronic accessory part 2 on the side surface of the main straight slot 30 of the closed slot antenna 3, a directivity factor of the antenna can still be reduced through a slot bending design of the closed slot antenna 3. FIG. 11 is a radiation pattern of the Wi-Fi antenna of the terminal in FIG. 10. It can be learned that the directivity factor of the Wi-Fi antenna of the terminal in FIG. 11 is less than that in FIG. 2, is close to 3.5 dBi, and is less than a directivity factor of a straight slot antenna.

In the terminal in this embodiment of this application, the first slot and the second slot that are bent to the same side from two ends of the main straight slot are disposed, so that the electric fields at the first slot and the second slot offset against each other. Therefore, when the layout position of the Wi-Fi antenna is limited, radiation intensity of the antenna in a same direction can be reduced, in other words, the directivity factor of the antenna is reduced, so that transmit power of the antenna is improved.

Optionally, the terminal body part 1 is a flat-panel structure, the terminal body part 1 includes two opposite main surfaces and a side surface connecting the two main surfaces, an antenna slot of the closed slot antenna 3 is disposed on one of the two main surfaces, and the electronic accessory part 2 is detachably connected to a relative position of the side surface of the terminal body part 1. When the closed slot antenna 3 needs to be located in positions shown in FIG. 9 and FIG. 10, antenna directivity of the closed slot antenna 3 is adversely affected if the electronic accessory part 2 is disposed on the side surface of the terminal body part 1. However, in this embodiment of this application, because of a bending setting manner of the closed slot antenna 3, adverse impact on antenna directivity that is caused by the electronic accessory part 2 is reduced, and the directivity factor of the antenna is reduced.

Figure 12:
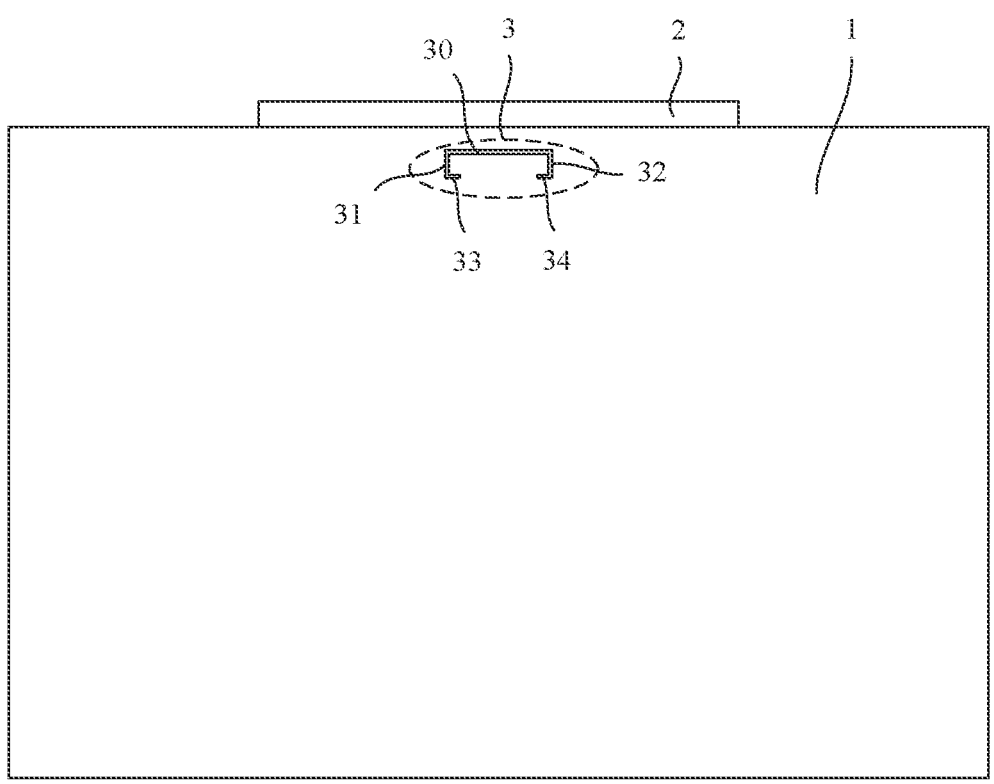
FIG. 12 is a top view of another terminal according to an embodiment of this application.

Optionally, refer to FIG. 10 and FIG. 12. FIG. 12 is a top view of another terminal according to an embodiment of this application. An antenna slot of a closed slot antenna 3 is shaped in "U" or non-closed square.

Figure 13:
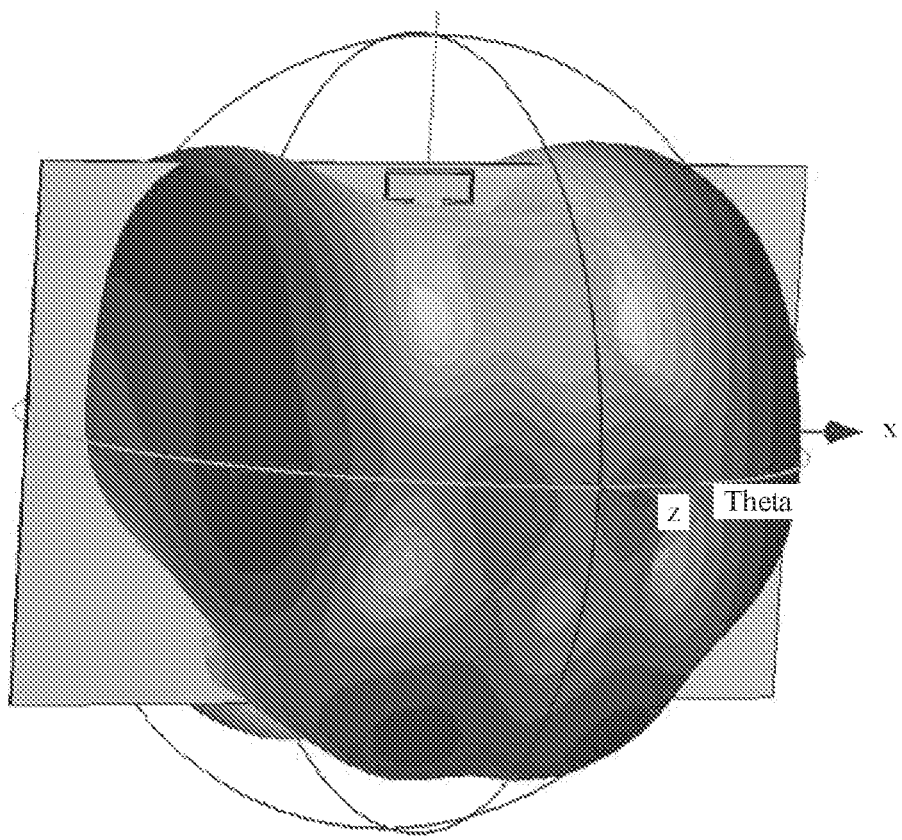
FIG. 13 is a radiation pattern of a Wi-Fi antenna of the terminal in FIG. 12.

Specifically, in the structure shown in FIG. 10, the main straight slot 30, the first slot 31, and the second slot 32 form a "U"-shaped structure, to form the closed slot antenna 3. In a structure shown in FIG. 12, in addition to the main straight slot 30, the first slot 31, and the second slot 32, the antenna slot of the closed slot antenna 3 includes a third slot 33 and a fourth slot 34. The third slot 33 is bent and extends to the right from a lower end of the first slot 31, and the fourth slot 34 is bent and extends to the left from a lower end of the second slot 32. The main straight slot 30, the first slot 31, the second slot 32, the third slot 33, and the fourth slot 34 form a structure of non-closed square, to form the closed slot antenna 3. FIG. 13 is a radiation pattern of a Wi-Fi antenna of the terminal in FIG. 12. It can be learned that a directivity factor of the Wi-Fi antenna of the terminal in FIG. 13 is less than that in FIG. 2, is close to 3.5 dBi, and is less than a directivity factor of a straight slot antenna.

Optionally, as shown in FIG. 9, FIG. 10, and FIG. 12, the terminal body part 1 is a tablet computer, and the electronic accessory part 2 is a stylus. The stylus may be adsorbed on a side surface of the tablet computer. In this case, the antenna slot of the closed slot antenna 3 is located near a rear housing of the tablet computer, and is adjacent to a side on which the stylus is adsorbed. When the stylus is adsorbed on the tablet computer, because of the bending setting manner of the closed slot antenna 3, adverse impact on antenna directivity that is caused by the stylus is reduced, and the directivity factor of the antenna is reduced.

Figure 14:
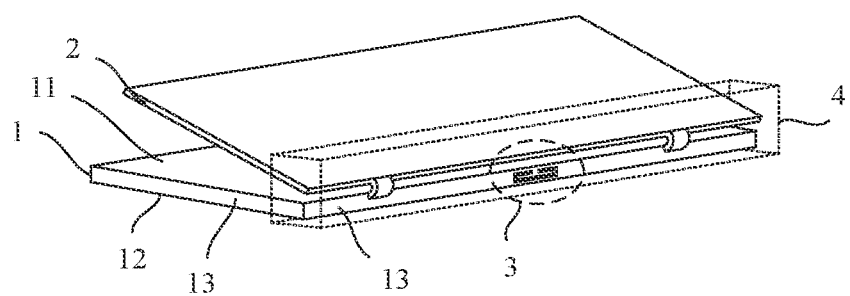
FIG. 14 is a schematic diagram of a three-dimensional structure of another terminal according to an embodiment of this application.
Figure 15:
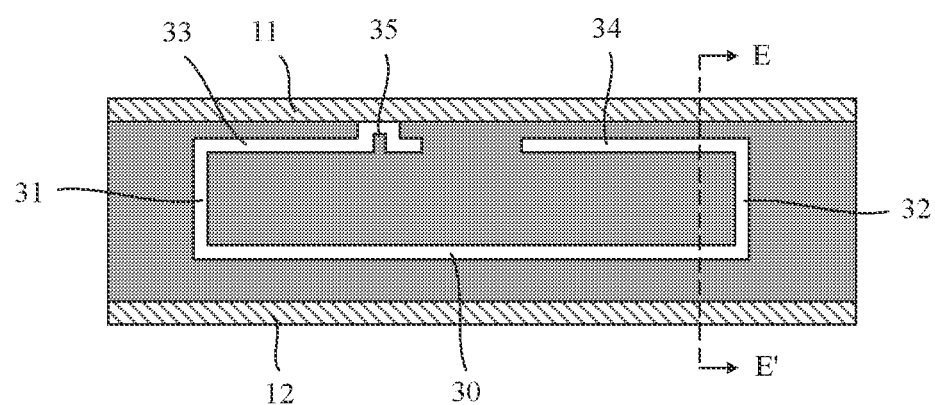
FIG. 15 is a schematic diagram of an enlarged structure at a closed slot antenna in FIG. 14.
Figure 16:
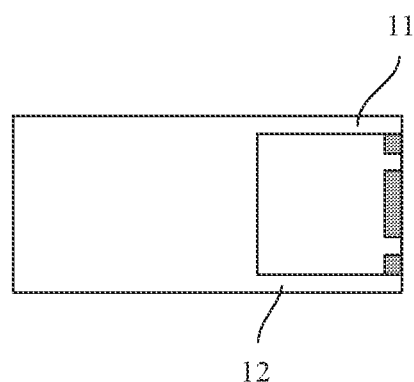
FIG. 16 is a schematic diagram of a cross-sectional structure in a direction EE' in FIG. 15.

Optionally, refer to FIG. 14, FIG. 15, and FIG. 16. FIG. 14 is a schematic diagram of a three-dimensional structure of another terminal according to an embodiment of this application. FIG. 15 is a schematic diagram of an enlarged structure at a closed slot antenna in FIG. 14. FIG. 16 is a schematic diagram of a cross-sectional structure in a direction EE' in FIG. 15. The terminal is a notebook computer, and a terminal body part 1 is a computer body part, and the terminal body part 1 includes an upper housing 11 and a lower housing 12 that are opposite and four side housings 13 connecting the upper housing 11 and the lower housing 12. An electronic accessory part 2 is a display, the terminal body part 1 has a hinge area 4 on a side edge of one side housing 13, and the electronic accessory part 2 is connected to the terminal body part 1 in the hinge area 4 by a hinge. A closed slot antenna 3 is located on the side housing 13 corresponding to the hinge area 4.

Specifically, for example, an antenna slot of the closed slot antenna 3 may be a slot of the side housing 13, or an antenna slot of the closed slot antenna 3 may be a slot of a conductive plate disposed on the side housing 13. The closed slot antenna 3 also includes a main straight slot 30 and a first slot 31 and a second slot 32 that are separately bent from two ends of the main straight slot 30 and extend to a same side of the main straight slot 30, both the first slot 31 and the second slot 32 are perpendicular to the main straight slot 30, and the electronic accessory part 2 is located on a side surface of the main straight slot 30. A position of the closed slot antenna 3 is limited to the side housing 13 corresponding to the hinge area 4. Therefore, the display causes adverse impact on antenna directivity of the closed slot antenna 3. In this embodiment of this application, because electric fields at the first slot 31 and the second slot 32 offset against each other, radiation enhancement of the antenna in a same direction is reduced, in other words, a directivity factor of the antenna is reduced, so that transmit power of the antenna is improved.

Optionally, as shown in FIG. 14, FIG. 15, and FIG. 16, when the notebook computer is in a folded state, a display surface of the electronic accessory part 2 is facing to the upper housing 11 of the terminal body part 1. The upper housing 11 of the terminal body part 1 is a ground electrically connected to the closed slot antenna 3.

Specifically, when the upper housing 11 of the terminal body part 1 is a ground electrically connected to the closed slot antenna 3, the upper housing 11 of the terminal body part 1 is grounded. The upper housing 11 is located between the display and the closed slot antenna 3. Radiation impact on the closed slot antenna 3 that is caused by the display is to radiate more radiation beams upward, and the ground reflects radiation of the antenna, in other words, the upper housing 11 enables a radiation beam of the antenna to be reflected downward. Therefore, disposing the upper housing 11 as the ground can reduce adverse impact on a radiation direction of the closed slot antenna 3 that is caused by the display, to further reduce the directivity factor of the antenna, so that transmit power of the antenna is improved.

Optionally, as shown in FIG. 14, FIG. 15, and FIG. 16, the antenna slot of the closed slot antenna 3 is shaped in non-closed square. A height of the side housing 13 of the notebook computer is usually relatively small. To increase an antenna length to meet a requirement, the antenna slot of the closed slot antenna 3 is set to a shape of non-closed square. To be specific, the closed slot antenna 3 further includes a third slot 33 and a fourth slot 34, the third slot 33 is bent and extends to the right from an upper end of the first slot 31, the fourth slot 34 is bent and extends to the left from an upper end of the second slot 32, and the main straight slot 30, the first slot 31, the second slot 32, the third slot 33, and the fourth slot 34 form a structure of non-closed square, to form the closed slot antenna 3.

Figure 17:
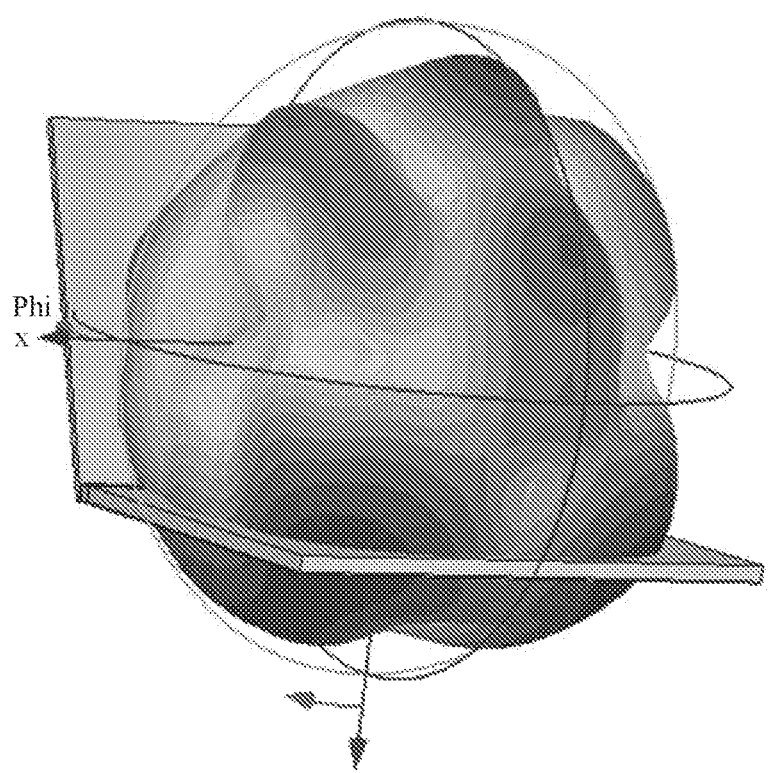
FIG. 17 is a radiation pattern of a Wi-Fi antenna of the terminal in FIG. 14.

Optionally, as shown in FIG. 14, FIG. 15, and FIG. 16, an end of the antenna slot of the closed slot antenna 3 is located on a side that is of the antenna slot and that is close to the upper housing 11 of the terminal body part 1. In other words, both an end of the third slot 33 and an end of the fourth slot 34 are located on a side that is of the main straight slot 30 and that is close to the upper housing 11. For example, the end of the third slot 33 is connected to the upper housing 11, and a feed point 35 is disposed herein, to separately implement feeding by using the feed point 35 and the upper housing 11. FIG. 17 is a radiation pattern of a Wi-Fi antenna of the terminal in FIG. 14. It can be learned that a directivity factor of the Wi-Fi antenna of the terminal in FIG. 17 is less than that in FIG. 8, is close to 5.2 dBi, and is less than a directivity factor of an IFA antenna.

In embodiments of this application, "at least one" means one or more, and "a plurality of" means two or more. The term "and/or" describes an association relationship for describing associated objects and indicates that three relationships may exist. For example, A and/or B may indicate the following three cases: Only A exists, both A and B exist, and only B exists. A and B may be in a singular form or a plural form. The character "/" generally indicates an "or" relationship between the associated objects. At least one of the following items and similar expressions refer to any combination of the items, including a single item or any combination of plural items. For example, at least one of a, b, and c may indicate a, b, c, a and b, a and c, b and c, or a, b, and c, where a, b, and c may be singular or plural.

The foregoing descriptions are embodiments but are not intended to limit this disclosure. For a person skilled in the art, various modifications and variations may be made according to this disclosure. Any modification, equivalent replacement, or improvement made without departing from the spirit and principle of this application shall fall within the protection scope of this disclosure.

What is claimed is:

1. A tablet computer comprising:
    a body part that is a flat-panel structure, comprising:
        two opposite main surfaces; and
        a side surface peripherally coupling the two opposite main surfaces, wherein the side surface comprises:
            a first side surface configured to accommodate a stylus; and
            a second side surface that is opposite to the first side surface; and
    a WI-FI antenna apparatus disposed on the body part and comprising an antenna slot located closer to the first side surface than the second side surface, wherein the antenna slot comprises a main straight slot, and wherein the main straight slot comprises:
  a first side comprising a first end and a second end;
  a first slot extending from the first end and is perpendicular to the main straight slot; and
  a second slot extending from the second end and is perpendicular to the main straight slot,
wherein the stylus is located on a side surface of the main straight slot when accommodated at the first side surface, and
wherein an antenna directivity coefficient of the WI-FI antenna apparatus is less than 7.5 decibels over isotropic (dBi) when the stylus is accommodated at the first side surface.

2. The tablet computer of claim 1, wherein the antenna slot is disposed on a first main surface of the two opposite main surfaces.

3. The tablet computer of claim 2, wherein the first main surface is of has a rectangular shape, wherein the first side surface and the second side surface are connected to the first main surface along long sides of the rectangular shape, and wherein a length of the stylus is less than a length of the long sides of the rectangular shape.

4. The tablet computer of claim 1, wherein the antenna slot has a "U" shape.

5. The tablet computer of claim 1, wherein the antenna slot has a rectangular shape with one partially open long side.

6. The tablet computer of claim 1, wherein the antenna slot is arranged adjacent to a rear cover of the tablet computer.

7. The tablet computer of claim 1, wherein an antenna directivity coefficient of the WI-FI antenna apparatus is close to 3.5 decibels over isotropic (dBi) when the stylus is accommodated at the first side surface.

8. A notebook computer, comprising:
  a body part, comprising:
    an upper housing;
    a lower housing located opposite to the upper housing;
    a side housing peripherally coupling the upper housing and the lower housing; and
    a hinge area on a side edge of the side housing;
  a display coupled to the body part in the hinge area by a hinge; and
  a WI-FI antenna apparatus disposed on the body part and comprising an antenna slot, wherein the antenna slot is located on the side housing corresponding to the hinge area, or is located on a conductive plate of the side housing corresponding to the hinge area, wherein the antenna slot comprises a main straight slot, and wherein the main straight slot comprises:
    a first side comprising a first end and a second end;
    a first slot extending from the first end and is perpendicular to the main straight slot; and
    a second slot extending from the second end and is perpendicular to the main straight slot, wherein an antenna directivity coefficient of the WI-FI antenna apparatus is less than 8 decibels over isotropic (dBi).

9. The notebook computer of claim 8, wherein when the body part and the display are in a folded state, a display surface of the display is configured to face the upper housing, and wherein the upper housing is a ground that is electrically coupled to the WI-FI antenna apparatus.

10. The notebook computer of claim 8, wherein the antenna slot has a "U" shape.

11. The notebook computer of claim 8, wherein the antenna slot further comprises a third slot and a fourth slot, wherein the third slot bent in a first direction extending from a first end of the first slot, wherein the fourth slot bent in a second direction extending from a second end of the second slot, and wherein the main straight slot, the first slot, the second slot, the third slot, and the fourth slot form a structure is in the form of a rectangle having one partially open long side.

12. The notebook computer of claim 11, wherein the WI-FI antenna apparatus comprises a feed point disposed at an end of the third slot.

13. The notebook computer of claim 8, wherein an end of the antenna slot is located on a side that is of the antenna slot and that is close to the upper housing of the body part.

14. The notebook computer of claim 8, wherein the display is located on a side surface of the main straight slot.

15. The notebook computer of claim 8, wherein an antenna directivity coefficient of the WI-FI antenna apparatus is close to 5.2 decibels over isotropic (dBi).

16. The notebook computer of claim 8, wherein the antenna slot has a non-closed square shape.

17. The notebook computer of claim 8, wherein the first slot and the second slot have a same length.

18. The notebook computer of claim 8, wherein the upper housing is grounded and is electrically coupled to the WI-FI antenna apparatus.

19. The notebook computer of claim 8, wherein the upper housing is configured to enable a radiation beam of the WI-FI antenna apparatus to be reflected downward.

* * * * *